US010526972B2

(12) United States Patent
Snyder

(10) Patent No.: US 10,526,972 B2
(45) Date of Patent: Jan. 7, 2020

(54) SEGMENTED FUEL DELIVERY SYSTEM

(71) Applicant: Rolls-Royce Corporation, Indianapolis, IN (US)

(72) Inventor: Anthony Snyder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 316 days.

(21) Appl. No.: 15/371,996

(22) Filed: Dec. 7, 2016

(65) Prior Publication Data

US 2018/0156126 A1 Jun. 7, 2018

(51) Int. Cl.
*F02C 7/22* (2006.01)
*F02C 7/228* (2006.01)

(52) U.S. Cl.
CPC ............... *F02C 7/222* (2013.01); *F02C 7/22* (2013.01); *F02C 7/228* (2013.01)

(58) Field of Classification Search
CPC .......... F02C 7/222; F23R 3/346; F23D 14/64; F23D 14/22; F23D 2201/20; F23C 5/08
USPC ............................................ 60/739; 431/181
See application file for complete search history.

(56) References Cited

U.S. PATENT DOCUMENTS

| 2,606,066 | A | * | 8/1952 | Thompson | F02C 7/228 123/454 |
| 2,629,225 | A | * | 2/1953 | Ammann | F02C 3/14 60/248 |
| 2,946,185 | A | | 7/1960 | Bayer | |
| 2,984,970 | A | * | 5/1961 | Bollenbacher | F02C 7/228 60/223 |
| 3,472,025 | A | | 10/1969 | Simmons et al. | |
| 3,774,851 | A | * | 11/1973 | Simmons | F02C 7/228 137/513.5 |
| 4,402,184 | A | * | 9/1983 | Faulkner | F02C 7/222 60/739 |
| 5,036,657 | A | | 8/1991 | Seto et al. | |
| 5,231,833 | A | * | 8/1993 | MacLean | F02C 7/222 60/734 |
| 6,711,898 | B2 | * | 3/2004 | Laing | F23R 3/283 60/739 |

(Continued)

FOREIGN PATENT DOCUMENTS

EP        2 733 424 A2    5/2014

OTHER PUBLICATIONS

Extended European Search Report, dated May 7, 2018, pp. 1-7, issued in European Patent Application No. 17201030.8, European Patent Office, The Hague, The Netherlands.

(Continued)

*Primary Examiner* — Scott J Walthour
*Assistant Examiner* — Todd N Jordan
(74) *Attorney, Agent, or Firm* — Brinks Gilson & Lione

(57) ABSTRACT

A fuel manifold may be provided for use in a turbine engine. The fuel manifold may include four discrete segments including a first segment, a second segment, a third segment, and a fourth segment. The fuel manifold may also include a first line coupled to the first segment and the second segment and a second line coupled to the third segment and the fourth segment. The first line may be configured to supply a first portion of the fuel to the first segment and a second portion of the fuel to the second segment. The second line may be configured to supply a third portion of fuel to the third line and a fourth portion of fuel to the fourth segment.

20 Claims, 5 Drawing Sheets

(56) References Cited

U.S. PATENT DOCUMENTS

| | | | |
|---|---|---|---|
| 9,310,072 B2 | 4/2016 | Ainslie | |
| 2010/0162709 A1* | 7/2010 | Morgan | F02C 7/222 60/734 |
| 2012/0073301 A1* | 3/2012 | Paradise | F02C 7/228 60/746 |
| 2015/0020528 A1* | 1/2015 | Fuller | F02C 7/222 60/746 |
| 2015/0176496 A1* | 6/2015 | Zordan | F02C 7/222 60/739 |
| 2016/0245182 A1* | 8/2016 | Elwasila | F02C 7/228 |
| 2017/0342912 A1* | 11/2017 | Kim | F02C 9/26 |

OTHER PUBLICATIONS

European Office Action, dated May 31, 2019, pp. 1-5, issued in European Patent Application No. 17201030.8, European Patent Office, Rijswijk, The Netherlands.

* cited by examiner

US 10,526,972 B2

SEGMENTED FUEL DELIVERY SYSTEM

TECHNICAL FIELD

This disclosure relates to fuel manifolds for use in turbine engines and, in particular, to manifolds that deliver fuel through multiple segments.

BACKGROUND

The statements in this section merely provide background information related to the present disclosure and may not constitute prior art.

Fuel manifolds may be used within a turbine engine to deliver fuel to a combustor. In some embodiments, the fuel manifolds may be annular or bifurcated.

SUMMARY

Further areas of applicability will become apparent from the description provided herein. It should be understood that the description and specific examples are intended for purposes of illustration only and are not intended to limit the scope of the present disclosure.

In one embodiment, a fuel manifold for use in a turbine engine is provided including four discrete segments, a first line, and a second line. The four discrete segments include a first segment, a second segment, a third segment, and a fourth segment. Each of the four discrete segments is configured to supply fuel to a combustor. The first line is coupled to the first segment and the second segment. The first line supplies a first portion of the fuel to the first segment and a second portion of the fuel to the second segment. The second line is coupled to the third segment and the fourth segment. The second line supplies a third portion of the fuel to the third segment and a fourth portion of the fuel to the fourth segment.

In another embodiment, a turbine engine is provided including a fuel manifold and a combustor. The fuel manifold includes four discrete segments including a first segment, a second segment, a third segment, and a fourth segment. The fuel manifold also includes a first line that is coupled to the first segment and the second segment and a second line that is coupled to the third segment and the fourth segment. The first line is configured to supply a first portion of the fuel to the first segment and a second portion of the fuel to the second segment. The second line is configured to supply a third portion of the fuel to the third segment and a fourth portion of the fuel to the fourth segment. Each of the four discrete segments is configured to supply the respective portion of the fuel to the combustor.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Where a combustor includes multiple injectors, such as in an annular or can-annular combustor, injectors arranged on the fuel manifold furthest from the source of the fuel may supply less fuel than injectors arranged on the fuel manifold closer to the source of the fuel. Additionally, gravitational effects may cause injectors arranged closer to the top of the combustor to supply less fuel than injectors on the same segment that are arranged closer to the bottom of the combustor. Therefore, a fuel manifold that minimizes the loss in fuel supply across the fuel manifold is desirable.

In one example, a fuel manifold is provided for use in a turbine engine. The fuel manifold comprises four discrete segments including a first segment, a second segment, a third segment, and a fourth segment. The fuel manifold further comprises a first line coupled to the first segment and the second segment and a second line coupled to the third segment and the fourth segment. The first line is configured to supply a first portion of the fuel to the first segment and a second portion of the fuel to the second segment. The second line is configured to supply a third portion of fuel to the third line and a fourth portion of fuel to the fourth segment.

One technical advantage of the systems and methods described below may be that a fuel manifold having four discrete segments may supply fuel to the injectors of the combustor more evenly than other fuel manifolds. Another technical advantage of the systems and methods described below may be that a fuel manifold having four discrete segments may minimize the uneven supply of fuel caused by gravitational effects. Yet another technical advantage of the systems and methods described below may be that a fuel manifold having four discrete segments may be that a more even supply of fuel to the injectors may cause a more even wear on a combustor section, increasing the life of the combustor.

Figure 1:
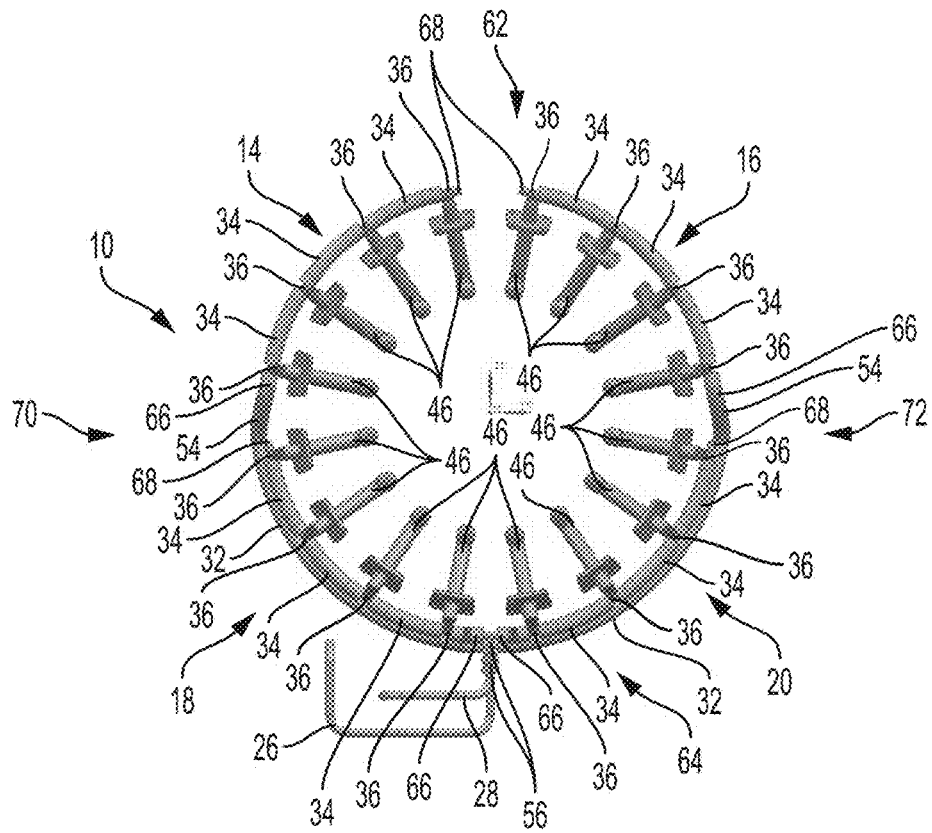
FIG. 1 illustrates a plan front view of a first example of a fuel manifold.
Figure 2:
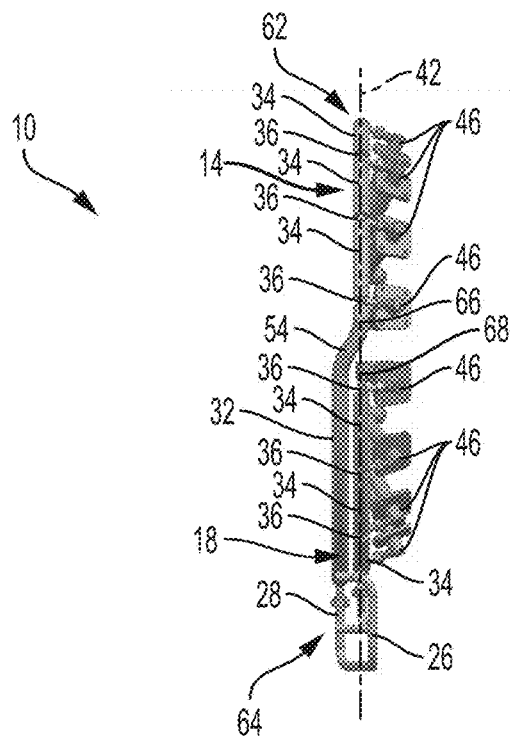
FIG. 2 illustrates a plan side view of a first example of a fuel manifold.
Figure 3:
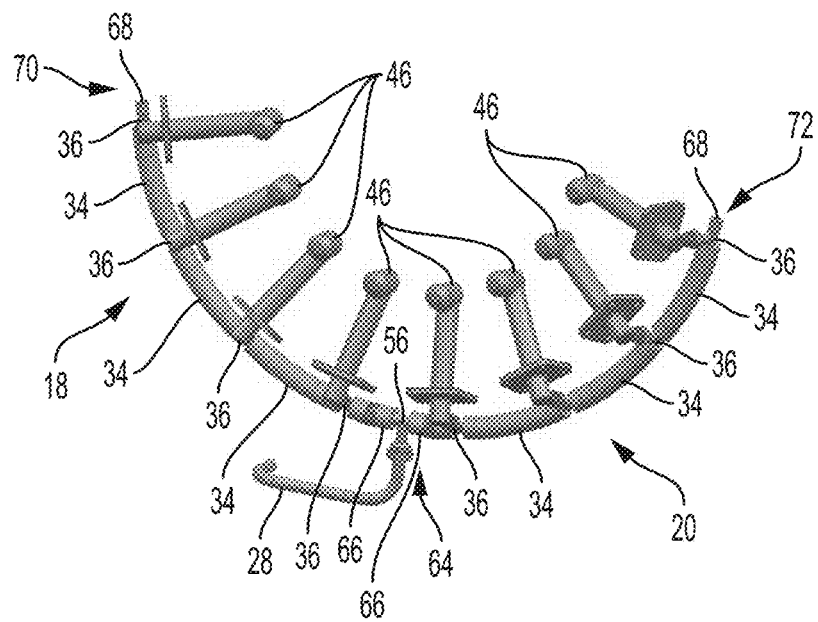
FIG. 3 illustrates a perspective view of a first portion of a first example of a fuel manifold.
Figure 4:
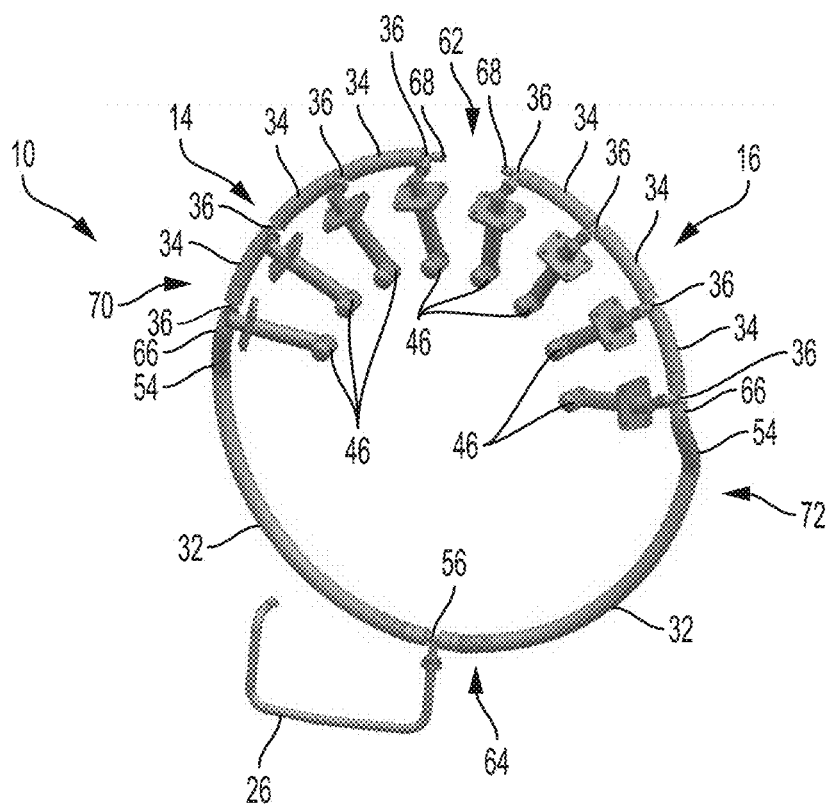
FIG. 4 illustrates a perspective view of a second portion of a first example of the fuel manifold.

FIGS. 1 and 2 illustrate a plan front view and a plan side view of a first example of a fuel manifold 10, respectively. FIGS. 3 and 4 illustrate perspective views of a first portion and a second portion of the first example of the fuel manifold 10.

The fuel manifold 10 may include four discrete segments 14, 16, 18, 20. The fuel manifold 10 may be any object that is configured to supply fuel to a combustor (such as a combustor 12 in FIG. 6) from a fuel source (such as a fuel source 58 in FIG. 6). Examples of the fuel manifold 10 may include any collection of pipes, tubes, and conduits that extend from the fuel source 58 to the combustor 12. As illustrated in FIG. 1, the fuel manifold 10 may include a first segment 14, a second segment 16, a third segment 18, and a fourth segment 20.

The segment 14, 16, 18, 20 may be any object that extends about a portion of the circumference of the combustor 12 and is configured to supply fuel to the combustor 12. Examples of the segment 14, 16, 18, 20 may include pipes, tubes, and conduits. The segments 14, 16, 18, 20 may be discrete from one another, separated and non-overlapping. The segments 14, 16, 18, 20 may also be discrete from one another, unconnected to one another except at a common line 26, 28 that is configured to supply fuel to the segments 14, 16, 18, 20.

The fuel manifold 10 may also include a first line 26 and a second line 28. A line 26, 28 may be any device configured to supply fuel from a fuel source 58 to the segments 14, 16, 18, 20. Examples of the lines 26, 28 may include pipes, tubes, and conduits. The lines 26, 28 may have a fluid path (not shown) that has a larger cross-sectional area than a cross-sectional area of a fluid path (60 in FIG. 5) of the segments 14, 16, 18, 20. The first line 26 may be coupled to the first segment 14 and the second segment 16 by a T-valve 56 that may divide the fuel from the first line 26 evenly between the first segment 14 and the second segment 16. The first line 26 may also be configured to supply a first portion of the fuel to the first segment 14 and a second portion of the fuel to the second segment 16. The second line 28 may be coupled to the third segment 18 and the fourth segment 20 by a T-valve 56 that may divide the fuel from the second line 28 evenly between the third segment 18 and the fourth segment 20. The second line 28 may also be configured to supply a third portion of the fuel to the third segment 18 and a fourth portion of the fuel to the fourth segment 20. Each segment 14, 16, 18, 20 may have a first end 66 through which fuel is supplied and a second end 68 that is opposite from the first end 66.

Each of the T-valves 56 coupled to the first line 26 and the second line 28 may have a first outlet and a second outlet. The first outlet of the T-valve 56 associated with the first line 26 may be configured to supply the first portion of the fuel to the first segment 14. The second outlet of the T-valve 56 associated with the first line 26 may be configured to supply the second portion of the fuel to the second segment 16. The first outlet of the T-valve 56 associated with the second line 28 may be configured to supply the third portion of the fuel to the third segment 18. The second outlet of the T-valve 56 associated with the second line 28 may be configured to supply the fourth portion of the fuel to the fourth segment 20.

Each of the four discrete segments 14, 16, 18, 20 includes a nozzle (44 in FIG. 5) that is coupled to an injector 46 and the respective segment 14, 16, 18, 20 and that allows fuel to flow from the respective segment 14, 16, 18, 20 to the injector 46. The nozzle 44 may be any object that allows fuel to pass from the segments 14, 16, 18, 20 to the injectors 46. Examples of the nozzles 44 may include a jet nozzle, a flow control valve, or any other suitable conduit. The injector 46 may be any object that extends into the combustor 12 and is configured to supply fuel to the combustor 12. As illustrated in FIGS. 1-4, each segment 14, 16, 18, 20 may have a similar number of injectors 46 to evenly supply fuel about the circumference of the combustor 12. Each of the four discrete segments 14, 16, 18, 20 may be coupled to between 1 and 5 injectors 46.

In some embodiments, each of the four discrete segments 14, 16, 18, 20 may have a substantially similar length, where none of the four discrete segments 14, 16, 18, 20 has a length that varies from more than 5% of the length of the longest of the four discrete segments 14, 16, 18, 20. In some embodiments, one of the four discrete segments 14, 16, 18, 20 may have a length that is longer than another of the four discrete segments 14, 16, 18, 20.

As illustrated in FIGS. 1-4, the fuel manifold 10 may be arranged such that the first line 26 is configured to supply fuel to the first segment 14 and the second segment 16 located at the top side 62 of the fuel manifold 10. The second line 28 may be configured to supply fuel to the third segment 18 and the fourth segment 20 located at the bottom side 64 of the fuel manifold 10. Having the first line 26 providing fuel to the top side 62 of the fuel manifold 10 and the second line providing fuel to the bottom side 64 of the fuel manifold 10 may result in more even distribution of fuel to the top side 62 and bottom side 64 of the fuel manifold 10.

As illustrated in FIGS. 1-4, the segments 14, 16, 18, 20 may each extend the same distance around the circumference of the combustor 12 as the other of the segments 14, 16, 18, 20. For example, each segment may extend around no greater than 25% of the circumference of the combustor 12. In some embodiments, the injectors 46 located near the first end 66 of the segment 14, 16, 18, 20 may have a higher fuel flow rate than injectors located near the second end 68 of the segment 14, 16, 18, 20.

Each segment 14, 16, 18, 20 may include flexible portions 34 and nozzle portions 36. The flexible portions 34 may be spaced between the injectors 46 about the circumference of the combustor 12. The flexible portions 34 may be less rigid than the nozzle portion 36 to allow the fuel manifold 10 adapt to vibration and thermal growth of the turbine engine (such as a turbine engine 80 in FIG. 6). The flexible portions 34 may comprise any conduit that is capable of expanding in response to vibration and thermal growth of a turbine engine 80. Examples of the flexible portions 34 may be a tube, a conduit, and a braided line. In some embodiments, the flexible portions 34 may include an inner silicone layer, a steel braid, and an outer silicone layer. The nozzle portions 36 may be spaced to circumferentially overlap with the injectors 46. The nozzle portions 36 may be any portion of the segment 14, 16, 18, 20 that is configured to overlap with an injector 46 and to supply fuel to an injector 46 through a nozzle 44. The nozzle portions 36 may be made of stainless steel, tungsten, titanium, or another suitable metal.

As illustrated in FIG. 2, the four discrete segments 14, 16, 18, 20 may be arranged in a plane 42 such that the injectors 46 are arranged to supply fuel to the same location along the length of the combustor 12. Nozzles 44 coupled to the nozzle portions 36 of the segments 14, 16, 18, 20 may extend away from the respective segment 14, 16, 18, 20 orthogonally to the plane 42.

As illustrated in FIGS. 1, 2, and 4, the first line 26 may include bypass lines 32 that extend between the T-valve 56 of the first line 26 and the first segment 14 and the second segment 16. Bypass lines 32 may be utilized where the T-valve 56 of the first line 26 is separated from the circumferential locations of the first segment 14 and the second segment 16 with respect to the combustor 12. In some embodiments, bypass lines 32 may extend about the circumference of the combustor 12 parallel to the plane 42, but offset from the plane 42. In some embodiments, the bypass lines 32 may be aligned with but offset from the third segment 18 and the fourth segment 20. Where the bypass line 32 nears the first end 66 of the first segment 14 or second segment 16, the bypass line 32 is coupled to the respective segment 14, 16 by an angled portion 54. The bypass lines 32 may be made of any material suitable to supply fuel to the four discrete segments 14, 16, 18, 20. In some embodiments, the bypass lines 32 may be made of the same material as the flexible portions 34.

The fuel supplied to the combustor 12 may be any suitable combustible fluid. Examples of the fuel may include Kerosene or an aviation turbine fuel such as Jet A or Jet A-1. When the turbine engine 80 is operating, the pressure of the fuel may be at least as high as a critical pressure, $p_c$, of the fuel. The critical pressure is the pressure required to liquefy a gas phase of the fuel at its critical temperature. If the gas turbine 80 is shut down, any fuel in the four discrete segments 14, 16, 18, 20 that has not entered a nozzle 44 may flow back through the first end 66 of the segment 14, 16, 18, 20, through the respective line 26, 28 and return to the fuel source 58. The injector 46 may include a valve (not shown) configured to prevent any fuel within the injector 46 from flowing back into the four discrete segments 14, 16, 18, 20 when the gas turbine 80 is shut down.

Figure 5:
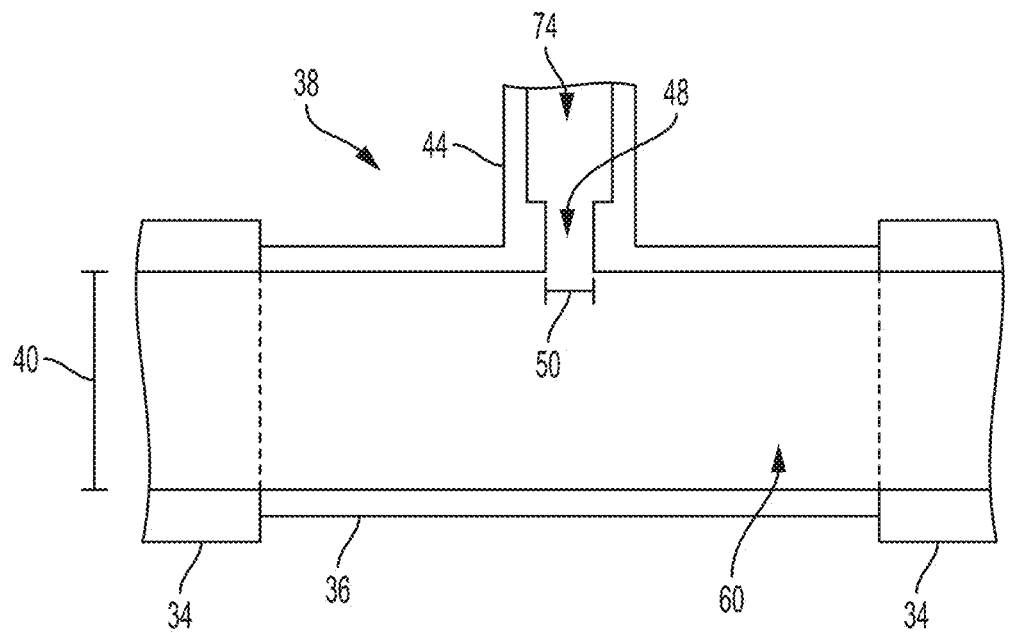
FIG. 5 illustrates a cross-sectional view of an example of a segment of a fuel manifold including a nozzle.

FIG. 5 illustrates a cross-sectional view of a segment 14, 16, 18, 20 including a nozzle portion 36 and flexible portions 34. The nozzle 44 may form a T-joint with the segment 14, 16, 18, 20, extending away from the segment 14, 16, 18, 20 at a perpendicular angle. The nozzle 44 may comprise an orifice 48 that allows fuel to flow to the injector 46. Examples of the orifice 48 may include a hole, a slot, or any other opening that allows fuel to pass through. Downstream from the orifice 48, the diameter of the fluid path 74 of the nozzle 44 may increase.

Fuel may travel through the fluid path 60 of the segment 14, 16, 18, 20 from the first end 66 of the segment 14, 16, 18, 20 to the second end 68 of the segment 14, 16, 18, 20. The fuel may flow over one or more orifices 48, evenly supplying the fuel across the nozzles 44. The cross-sectional area 50 of the orifices 48 limits the amount of fuel that may pass into the nozzles 44. To maintain constant pressure in the segment 14, 16, 18, 20 and to allow for even distribution into a plurality of nozzles 44, the fluid path 60 of a respective one of the four discrete segments 14, 16, 18, 20 may have a cross-sectional area 40 that is greater than a combined cross-sectional area that comprises a sum of cross-sectional areas 50 of the orifices 48 of all of the nozzles 44 configured to receive fuel from the respective one of the four discrete segments 14, 16, 18, 20. Where the cross-sectional area 40 of the segment 14, 16, 18, 20 is less than or equal to the combined cross-sectional area 50 of the orifices 48 configured to receive fuel from the segment 14, 16, 18, 20, an amount of fuel supplied to the injectors 46 further from the first end 66 of the segment 14, 16, 18, 20 may be lower than an amount of fuel supplied to the injectors 46 closer to the first end 66 of the segment 14, 16, 18, 20.

Figure 6:
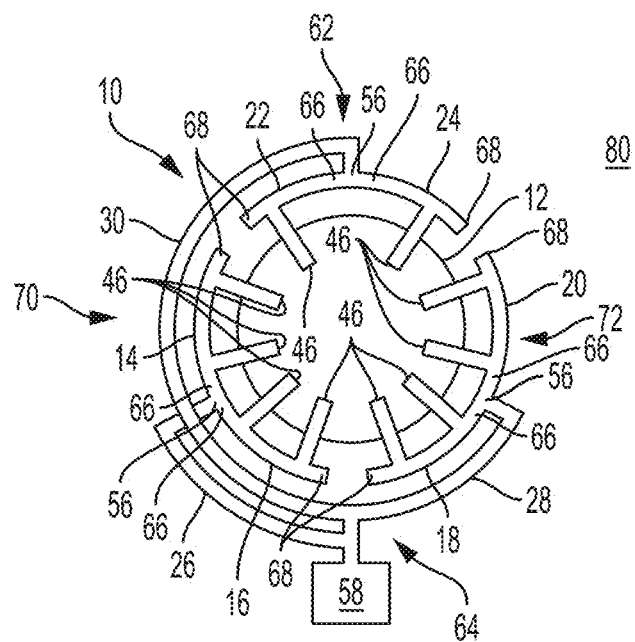
FIG. 6 illustrates a front cross-sectional view of a first example of a turbine engine including a combustor and a fuel manifold.

FIG. 6 illustrates a front cross-sectional view of a first example of the turbine engine 80 including the fuel manifold 10 and the combustor 12. As illustrated in FIG. 6, the fuel manifold 10 may include a fifth segment 22 and a sixth segment 24 that are arranged around a portion of the circumference of the combustor. A third line 30 may be coupled to the fifth segment 22 and the sixth segment 24. The third line 30 may be configured to supply of fifth portion of the fuel to the fifth segment 22 and a sixth portion of the fuel to the sixth segment 24. The fifth segment 22 and the sixth segment 24 may be configured to supply fuel to injectors 46.

As illustrated in FIG. 6, in some embodiments, the fifth segment 22 and the sixth segment 24 may be coupled to fewer injectors 46 than the four discrete segments 14, 16, 18, 20. In such a configuration, a circumferential length of the fifth segment 22 and the sixth segment 24 may be less than the circumferential length of the four discrete segments 14, 16, 18, 20. For example, in some embodiments the first segment 14, second segment 16, third segment, 18, and fourth segment 20 may be circumferentially arranged near the bottom side 64 of the combustor 12 and each extend around 16.7% to 20% of the circumference of the combustor 12, where the fifth segment 22 and the sixth segment 24 may be circumferentially arranged near the top side 62 of the combustor 12 and each extend around 10% to 16.7% of the circumference of the circumference of the combustor 12. Having a shorter fifth segment 22 and sixth segment 24 arranged near the top side 62 of the combustor 12 may mitigate the loss of fuel supplied to the injectors near the top side 62 of the combustor 12 caused by gravitational effects.

Figure 7:
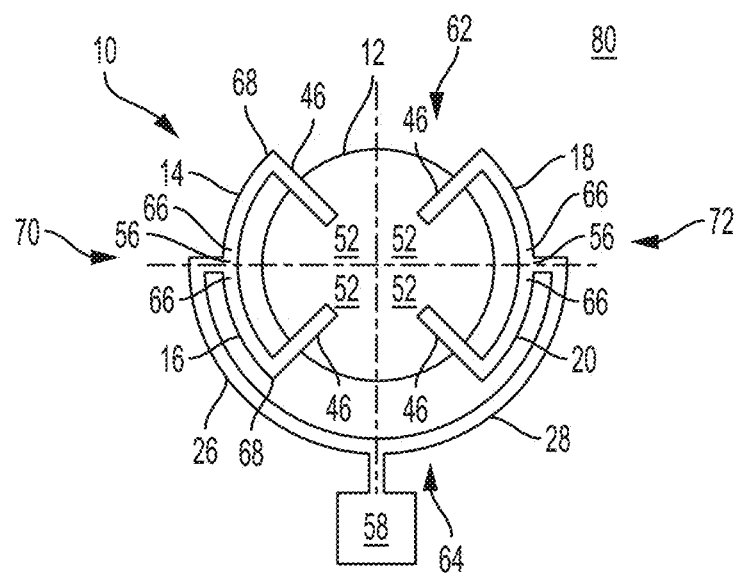
FIG. 7 illustrates a front cross-sectional view of a second example of a turbine engine including a combustor and a fuel manifold.
Figure 8:
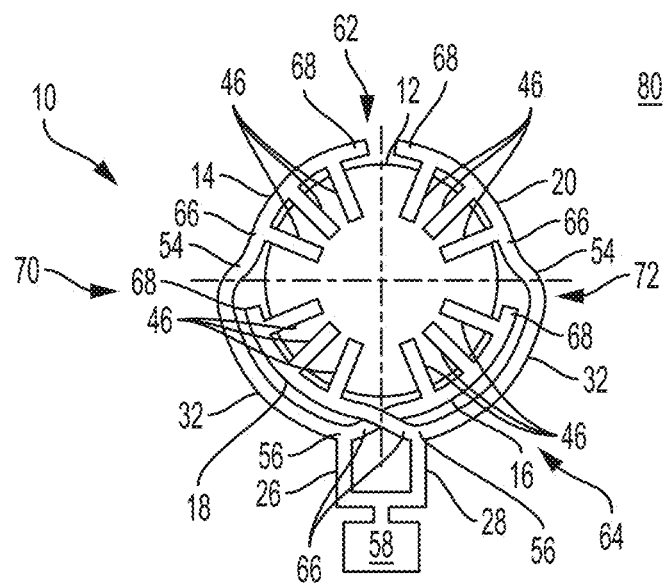
FIG. 8 illustrates a front cross-sectional view of a third example of a turbine engine including a combustor and a fuel manifold.

FIG. 7 illustrates a front cross-sectional view of a second example of the turbine engine 80 including the fuel manifold 10 and the combustor 12. In some embodiments, the four discrete segments 14, 16, 18, 20 may be arranged to supply fuel to four circumferential quadrants 52 of the combustor 12. The quadrants 52 may be any division of the circumference of the combustor 12 into four portions. The quadrants 52 may be equally sized or some quadrants 52 may be larger than others. The quadrants may be arranged to correspond with the top side 62, bottom side 64, left side 70, and right side 72 of the combustor 12. Alternatively, as illustrated in FIGS. 7 and 8, the quadrants 52 may be arranged such that there is the quadrant 52 corresponding with the top side 62 and left side 70 of the combustor 12, the quadrant 52 corresponding with the top side 62 and right side 72 of the combustor 12, the quadrant 52 corresponding with the bottom side 64 and left side 70 of the combustor 12, and the quadrant 52 corresponding with the bottom side 64 and the right side 72 of the combustor 12.

In the embodiment of the fuel manifold 10 shown in FIGS. 1-4, the four discrete segments 14, 16, 18, 20 may be configured such that the first segment 14 is aligned with the quadrant 52 corresponding with the top side 62 and left side 70 of the combustor 12, the second segment 16 is aligned with the quadrant 52 corresponding with the top side 62 and right side 72 of the combustor 12, the third segment 18 is aligned in the quadrant 52 corresponding with the bottom side 64 and left side 70 of the combustor 12, and the fourth segment 20 is aligned in the quadrant 52 corresponding with the bottom side 64 and right side 72 of the combustor 12.

In the embodiment of the fuel manifold 10 shown in FIGS. 1-4, the four discrete segments 14, 16, 18, 20 may be configured such that the first segment 14 is aligned with the quadrant 52 corresponding with the top side 62 and left side 70 of the combustor 12, the second segment 16 is aligned with the quadrant 52 corresponding with the top side 62 and right side 72 of the combustor 12, the third segment 18 is aligned with the quadrant 52 corresponding with the bottom side 64 and left side 70 of the combustor 12, and the fourth segment 20 is aligned with the quadrant 52 corresponding with the bottom side 64 and right side 72 of the combustor 12. In this configuration, where the first line 26 supplies fuel to the top side 62 of the combustor and the second line 28 supplies fuel to the bottom side 64 of the combustor 12, bypass lines 32 may be utilized on the first line 26 to allow the first segment 14 and the second segment to be arranged with their respective quadrants 52.

In the embodiment of the fuel manifold 10 shown in FIG. 7, the four discrete segments 14, 16, 18, 20 may be configured such that the first segment 14 is aligned with the quadrant 52 corresponding with the top side 62 and left side 70 of the combustor 12, the second segment 16 is aligned with the quadrant 52 corresponding with the bottom side 64 and left side 70 of the combustor 12, the third segment 18 is aligned with the quadrant 52 corresponding with the top side 62 and right side 72 of the combustor 12, and the fourth segment 20 is aligned with the quadrant 52 corresponding with the bottom side 64 and right side 72 of the combustor 12. In such a configuration, where the first line 26 supplies fuel to the left side 70 of the combustor 12 and the second line 28 supplies fuel to the right side 72 of the combustor 12, the first line 26 and second line 28 may not need bypass lines 32 to allow the four discrete segments 14, 16, 18, 20 to be arranged with their respective quadrants 52.

FIG. 8 illustrates a front cross-sectional view of a third example of the turbine engine 80 including the fuel manifold 10 and the combustor 12. As illustrated in FIG. 8, the four discrete segments 14, 16, 18, 20 may be configured such that the first segment 14 is aligned with the quadrant 52 corresponding with the top side 62 and left side 70 of the combustor 12, the second segment 16 is aligned with the quadrant 52 corresponding with the bottom side 64 and right side 72 of the combustor 12, the third segment 18 is aligned with the quadrant 52 corresponding with the bottom side 64 and left side 70 of the combustor 12, and the fourth segment 20 is aligned with the quadrant 52 aligned with the top side 62 and right side 72 of the combustor 12. In such a configuration, the first line 26 may utilize a bypass line 32 to allow the first segment 14 to reach its quadrant 52 and the second line 28 may utilize a bypass line 32 to allow the fourth segment 20 to reach its quadrant 52.

Furthermore, although specific components are described above, methods, systems, and articles of manufacture described herein may include additional, fewer, or different components. For example, the fuel manifold 10 may include further segments 14, 16, 18, 20, 22, 24 than described herein.

Figure 9:
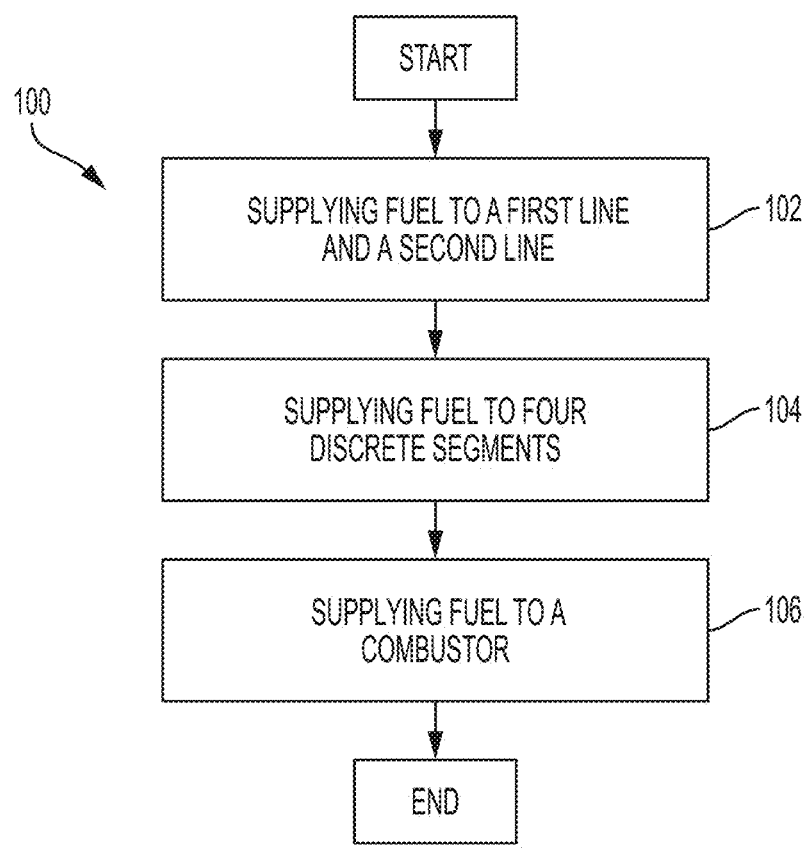
FIG. 9 illustrates a flow diagram of operations to supply fuel to a combustor.

FIG. 9 illustrates a flow diagram of operations to supply fuel to the combustor 12 (100). The operations may include fewer, additional, or different operations than illustrated in FIG. 6. Alternatively or in addition, the operations may be performed in a different order than illustrated.

To supply fuel to the combustor 12 (100), fuel is supplied from the fuel source 58 to the first line 26 and the second line 28 (102). Fuel is also supplied from the first line 26 and the second line 28 to the four discrete segments 14, 16, 18, 20 (104). The first line 26 is coupled to the first segment 14 and the second segment 16 and the second line 28 is coupled to the third segment 18 and the fourth segment 20. Fuel is also supplied from the four discrete segments 14, 16, 18, 20 to the combustor 12 (106).

The method of supplying fuel to the combustor 12 (100) may also include supplying fuel from the four discrete segments 14, 16, 18, 20 to the injectors 46 coupled to each of the four discrete segments 14, 16, 18, 20 and also suppling fuel from the injectors 46 to the combustor 12.

The method of supplying fuel to the combustor 12 (100) may also include the fuel source 58 maintaining the pressure of the fuel manifold at least as high as a critical pressure, $p_c$, of the fuel. The critical pressure is the pressure required to liquefy a gas phase of the fuel at its critical temperature.

The method of supplying fuel to the combustor 12 (100) may also include passing fuel through orifices 48 in nozzles 44 coupled to each of the four discrete segments 14, 16, 18, 20. The cross-sectional area 40 of the fluid path 60 of the respective segment 14, 16, 18, 20 is greater than the combined cross-sectional area 50 of the orifices 48 of all of the nozzles 44 configured to receive fuel from the respective segment 14, 16, 18, 20.

In addition to the advantages that have been described, it is also possible that there are still other advantages that are not currently recognized but that may become apparent at a later time. While various embodiments have been described, it will be apparent to those of ordinary skill in the art that many more embodiments and implementations are possible. Accordingly, the embodiments described herein are examples, not the only possible embodiments and implementations.

What is claimed is:

1. A method of supplying fuel to a combustor, comprising supplying fuel from a fuel source to a first line and a second line;

supplying fuel from the first line and the second line to four discrete segments, including a first segment, a second segment, a third segment, and a fourth segment, wherein the first line is coupled to the first segment and the second segment, and the second line is coupled to the third segment and the fourth segment; and supplying fuel from the four discrete segments to the combustor, wherein supplying fuel from the four discrete segments to the combustor comprises passing the fuel through a respective plurality of nozzle portions coupled to each of the four discrete segments, wherein each nozzle portion has a respective orifice configured to supply fuel via a respective fuel nozzle to the combustor, wherein a maximum cross-sectional area of a fluid path within each of the four discrete segments is greater than a combined minimum cross-sectional area of all orifices of the respective plurality of nozzle portions configured to receive fuel from the respective one of the four discrete segments.

2. The method of claim 1, wherein the fuel source maintains a pressure which maintains the fuel in the four discrete segments in a liquid state.

3. The method of claim 1, wherein the first segment and the second segment are circumferentially separated from one another by at least one of the third segment or the fourth segment.

4. A fuel manifold for use in a turbine engine, the fuel manifold comprising:

four discrete segments including a first segment, a second segment, a third segment, and a fourth segment, wherein each of the four discrete segments are configured to supply fuel to a combustor;

a first line coupled to the first segment and the second segment, wherein the first line is configured to supply a first portion of the fuel to the first segment and a second portion of the fuel to the second segment; and a second line coupled to the third segment and the fourth segment, wherein the second line is configured to supply a third portion of the fuel to the third segment and a fourth portion of the fuel to the fourth segment; wherein each of the four discrete segments comprises a respective plurality of nozzle portions, each nozzle portion having an orifice configured to supply fuel via a respective fuel nozzle to the combustor, and wherein a maximum cross-sectional area of a fluid path through a respective one of the four discrete segments is greater than a combined minimum cross-sectional area of all orifices of the respective plurality of nozzle portions which are configured to receive fuel from the respective one of the four discrete segments.

5. The fuel manifold of claim 4, wherein each nozzle portion forms a T-joint with the respective segment of the four discrete segments.

6. The fuel manifold of claim 4, wherein each of the four discrete segments comprises a flexible portion, and each flexible portion is less rigid than each nozzle portion.

7. The fuel manifold of claim 4, wherein each of the four discrete segments has a length that is substantially the same as the other of the four discrete segments.

8. The fuel manifold of claim 4, wherein at least one of the four discrete segments has a length that is longer than another of the four discrete segments.

9. The fuel manifold of claim 4, further comprising a fifth segment configured to supply fuel to the combustor, wherein the fifth segment is coupled to a third line.

10. The fuel manifold of claim 4, wherein the first line is coupled to the first segment and the second segment via a first T-connection, wherein a first outlet of the first T-connection is configured to supply the first portion of the fuel to the first segment and a second outlet of the first T-connection is configured to supply the second portion of the fuel to the second segment; and wherein the second line is coupled to the third segment and the fourth segment via a second T-connection, wherein a first outlet of the second T-connection is configured to supply the third portion of the fuel to the third segment and a second outlet of the second T-connection is configured to supply the fourth portion of the fuel to the fourth segment.

11. A turbine engine, comprising:

a fuel manifold comprising four discrete segments including a first segment, a second segment, a third segment, and a fourth segment, a first line coupled to the first segment and the second segment, wherein the first line is configured to supply a first portion of the fuel to the first segment and a second portion of the fuel to the second segment, and a second line is coupled to the third segment through a first bypass line, the second line is coupled to the fourth segment through a second bypass line, wherein the second line is configured to supply a third portion of the fuel to the third segment and a fourth portion of the fuel to the fourth segment; and a combustor, wherein each of the four discrete segments are configured to supply the respective portion of the fuel to the combustor, wherein the four discrete segments extend circumferentially around the combustor and are arranged within a plane, wherein the first bypass line and the second bypass line extend circumferentially around the combustor parallel to and offset from the plane, wherein each of the four discrete segments comprises a respective plurality of nozzle portions, each nozzle portion having an orifice configured to supply fuel via a respective fuel nozzle to the combustor, and wherein a maximum cross-sectional area of a fluid path through a respective one of the four discrete segments is greater than a combined minimum cross-sectional area of all orifices of the respective plurality of nozzle portions which are configured to receive fuel from the respective one of the four discrete segments.

12. The turbine engine of claim 11, wherein for each of the four discrete segments the respective nozzle portions extend away from the respective segment orthogonally to the plane.

13. The turbine engine of claim 11, wherein the four discrete segments are circumferentially spaced around the combustor such that each segment is aligned with a circumferential quadrant of the combustor.

14. The turbine engine of claim 13, wherein the first segment is aligned with a first circumferential quadrant, and the second segment is aligned with a second circumferential quadrant that is adjacent to the first circumferential quadrant.

15. The turbine engine of claim 13, wherein the first segment is aligned with a first circumferential quadrant, and the second segment is aligned with a second circumferential quadrant that is opposed to the first circumferential quadrant.

16. The turbine engine of claim 13, wherein the first segment and second segment are aligned with circumferential quadrants on a first side of the combustor, and the third segment and fourth segment are aligned with circumferential quadrants on a second side of the combustor.

17. The turbine engine of claim 16, wherein the first line is coupled to the first segment and the second segment via a first T-connection, wherein a first outlet of the first T-connection is configured to supply the first portion of the fuel to the first segment and a second outlet of the first T-connection is configured to supply the second portion of the fuel to the second segment;

wherein the second line is coupled to the first bypass line and the second bypass line via a second T-connection, wherein a first outlet of the second T-connection is configured to supply the third portion of the fuel to the first bypass line and a second outlet of the second T-connection is configured to supply the fourth portion of the fuel to the second bypass line; and wherein the first T-connection and the second T-connection are arranged on the first side of the combustor.

18. The turbine engine of claim 11, wherein each of the four discrete segments comprises a flexible portion, and each flexible portion is less rigid than each nozzle portion.

19. The turbine engine of claim 18, wherein the first bypass line and the second bypass line comprise the same material as the flexible portion.

20. The turbine engine of claim 11, wherein the first bypass line is coupled to the third segment by a first angled portion, and the second bypass line is coupled to the fourth segment by a second angled portion.

* * * * *